US012798245B2

(12) United States Patent
Somete et al.

(10) Patent No.: US 12,798,245 B2
(45) Date of Patent: Nov. 17, 2026

(54) MAINTENANCE DEVICE AND INKJET RECORDING APPARATUS

(71) Applicant: KYOCERA Document Solutions Inc., Osaka (JP)

(72) Inventors: Takashi Somete, Osaka (JP); Yiquan Nie, Osaka (JP); Noriaki Furukawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 118 days.

(21) Appl. No.: 18/949,478

(22) Filed: Nov. 15, 2024

(65) Prior Publication Data

US 2025/0162322 A1 May 22, 2025

(30) Foreign Application Priority Data

Nov. 16, 2023 (JP) ................................ 2023-195044

(51) Int. Cl.
*B41J 2/165* (2006.01)

(52) U.S. Cl.
CPC ................................ *B41J 2/16508* (2013.01)

(58) Field of Classification Search
CPC .... B41J 2/165; B41J 2/16505; B41J 2/16507; B41J 2/16511; B41J 2/16523
See application file for complete search history.

(56) References Cited

U.S. PATENT DOCUMENTS

2012/0154474 A1 6/2012 Hazeyama
2013/0010028 A1* 1/2013 Taira .................... B41J 2/16508 347/25
2023/0182473 A1* 6/2023 Ishida .................. B41J 2/16552 347/28

FOREIGN PATENT DOCUMENTS

JP H01-210350 A 8/1989
JP 2003-276214 A 9/2003
JP 2012-131064 A 7/2012

* cited by examiner

*Primary Examiner* — Scott A Richmond
(74) *Attorney, Agent, or Firm* — Studebaker Brackett PLLC

(57) ABSTRACT

A maintenance device maintains a head unit including an inkjet head. The maintenance device includes a cap, a supply part, a first heating part, and a second heating part. The cap is attached on a nozzle surface of the inkjet head. The supply part stores a humidifying medium, generates a humidified air by passing air through the humidifying medium, and supplies the humidified air to the cap. The first heating part heats the supply part. The second heating part heats the cap.

3 Claims, 9 Drawing Sheets

MAINTENANCE DEVICE AND INKJET RECORDING APPARATUS

INCORPORATION BY REFERENCE

This application is based on and claims the benefit of priority from Japanese patent application No. 2023-195044 filed on Nov. 16, 2023 which is incorporated by reference in its entirety.

BACKGROUND

The present disclosure relates to a maintenance device which maintains an inkjet head and an inkjet recording apparatus.

In an inkjet recording apparatus using a water-based ink, there is a possibility that moisture evaporates from the ink in a nozzle while a printing operation is not performed, thereby increasing a viscosity of the ink to cause ejection failure and clogging. Therefore, a technique for suppressing the evaporation of moisture from the ink in the nozzle has been conventionally studied. For example, there is a device for supplying humidified air into a cap covering an ejection surface (a nozzle surface) of a head.

In addition, a technique for enhancing humidifying effect has been discussed. For example, there have been proposed a configuration in which a humidity in a cap is increased by heating and evaporating a moisturizing liquid in the cap and a configuration in which a humidity in a cap is increased by cooling the inside of the cap.

However, when the moisturizing liquid is heated in the cap, there is a problem that it is difficult to control the humidity. Further, in the case of cooling the inside of the cap, when a temperature of the inkjet head is higher than a temperature of the inside of the cap, there is a problem that a relative humidity in the vicinity of a nozzle becomes low and water evaporates from the ink.

SUMMARY

A maintenance device according to the present disclosure maintains a head unit including an inkjet head. The maintenance device includes a cap, a supply part, a first heating part, and a second heating part. The cap is attached on a nozzle surface of the inkjet head. The supply part stores a humidifying medium, generates a humidified air by passing air through the humidifying medium, and supplies the humidified air to the cap. The first heating part heats the supply part. The second heating part heats the cap.

An inkjet recording apparatus according to the present disclosure includes the inkjet head, and the maintenance device.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, with reference to the drawings, an inkjet recording apparatus 1 according to one embodiment of the present embodiment will be described.

Figure 1:
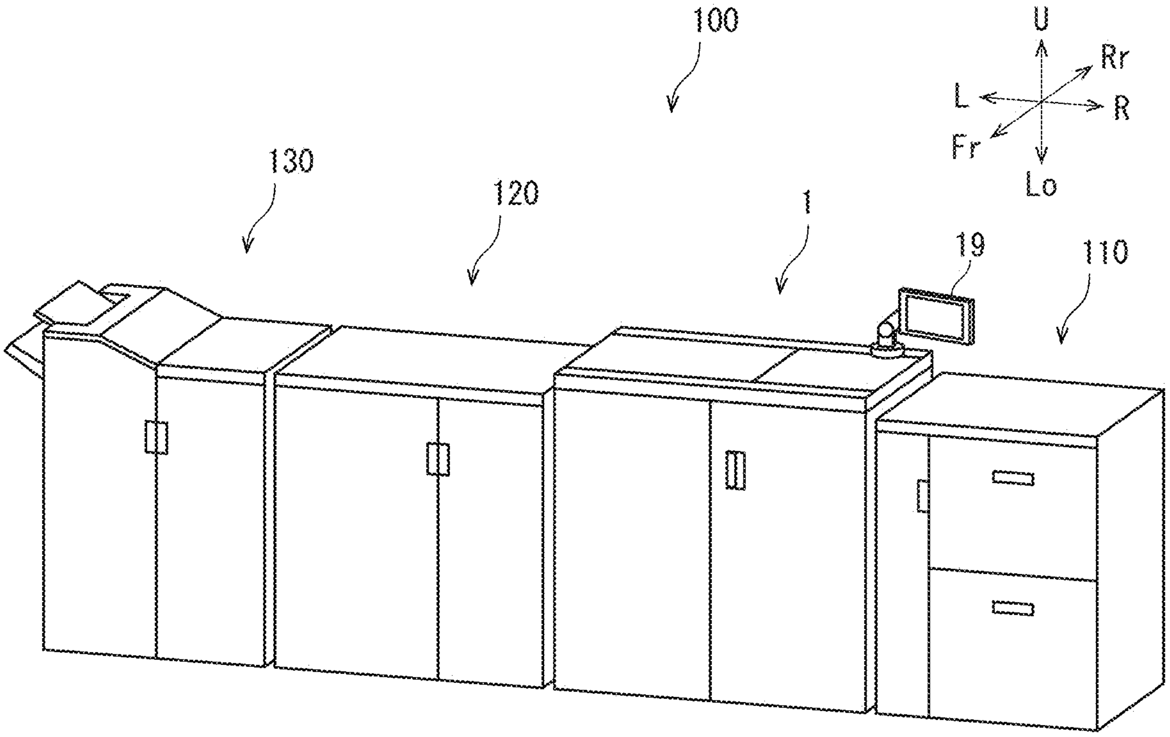
FIG. 1 is a perspective view showing an appearance of an image forming system according to one embodiment of the present disclosure.
Figure 2:
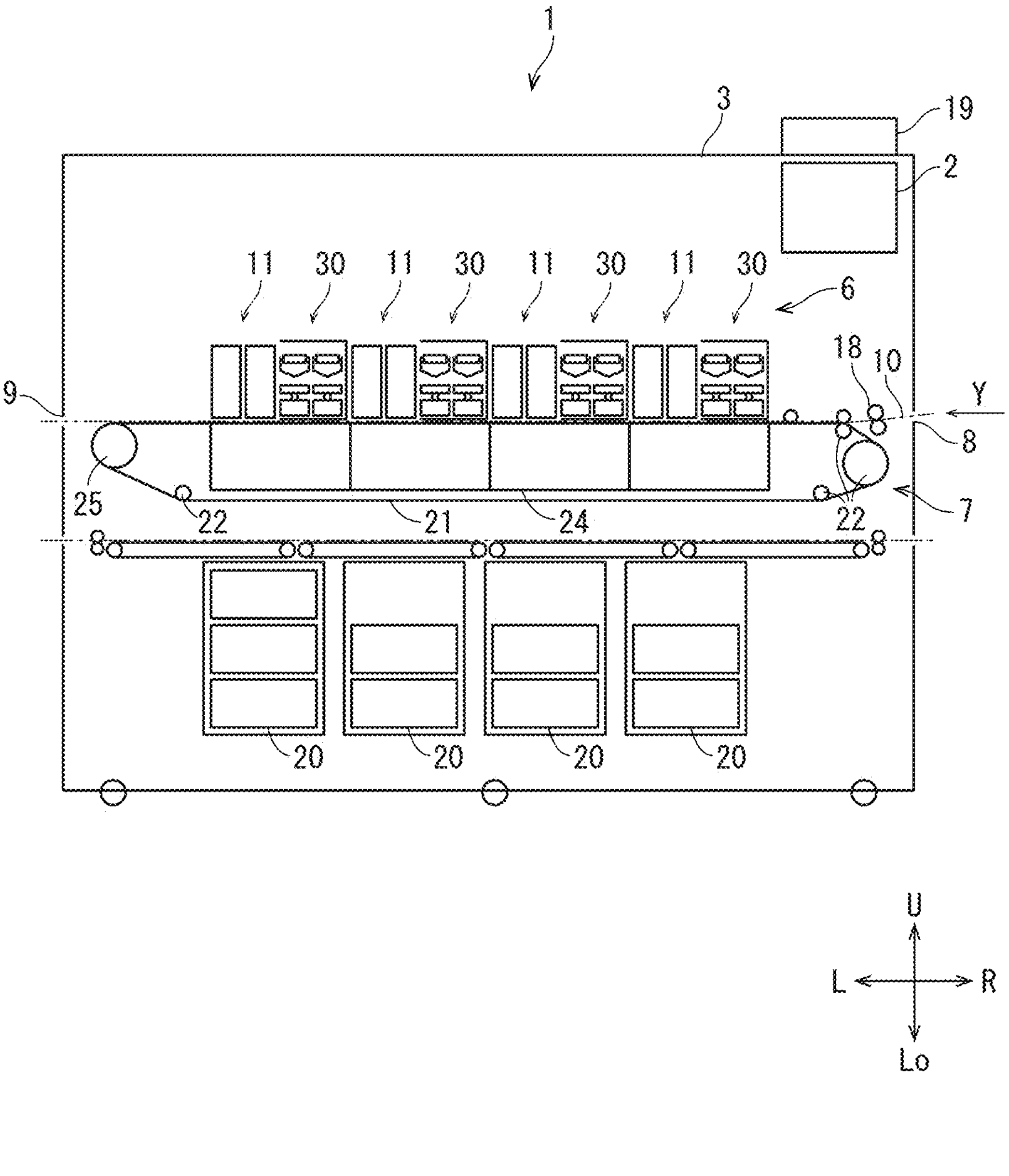
FIG. 2 is a front view schematically showing an internal structure of an inkjet recording apparatus according to the embodiment of the present disclosure.
Figure 3:
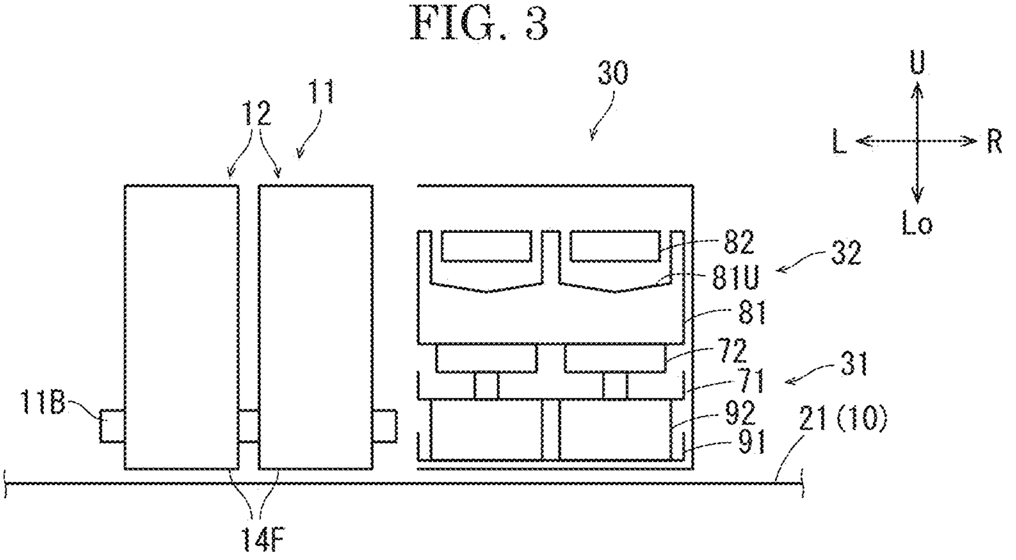
FIG. 3 is a front view schematically showing a head unit and a maintenance device according to the embodiment of the present disclosure.
Figure 4:
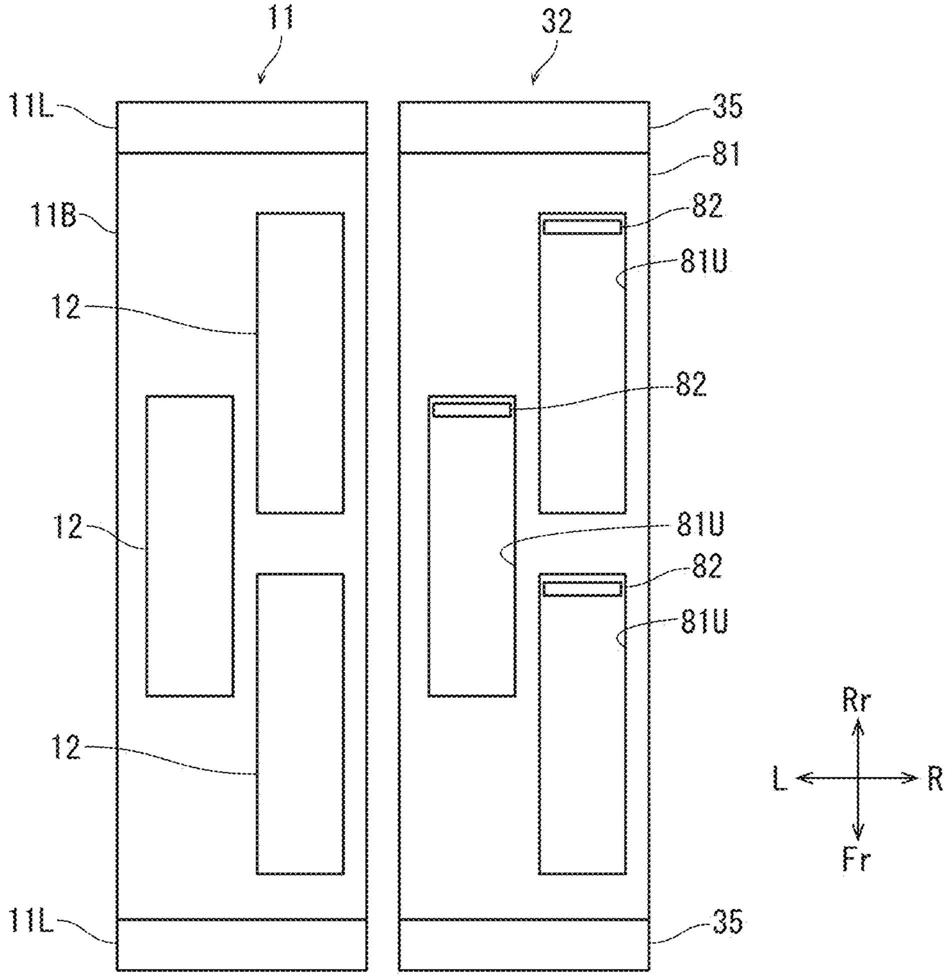
FIG. 4 is a plan view schematically showing the head unit and a wipe unit according to the embodiment of the present disclosure.
Figure 5:
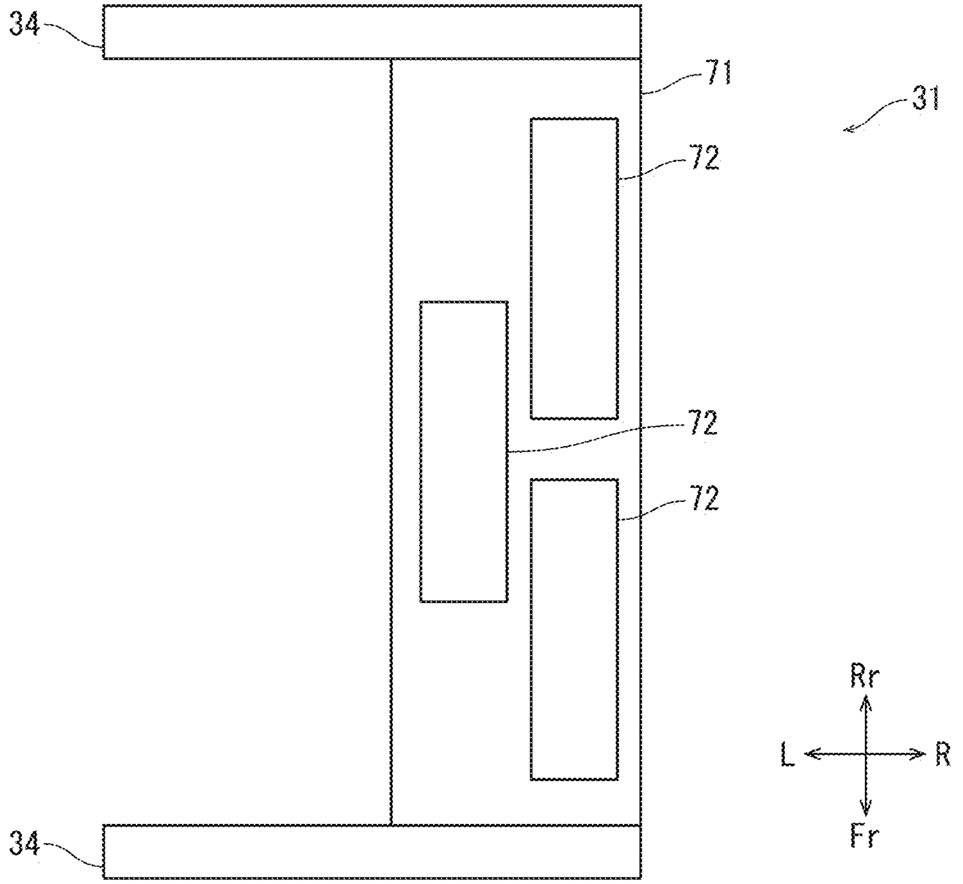
FIG. 5 is a plan view schematically showing a cap unit according to the embodiment of the present disclosure.
Figure 6:
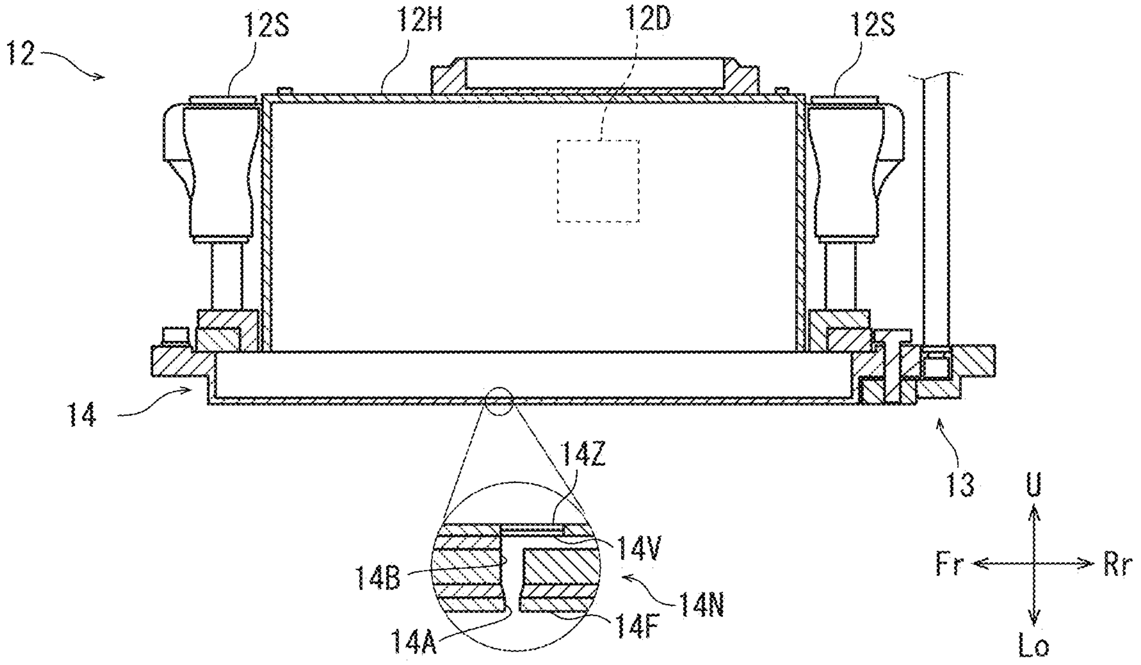
FIG. 6 is a cross-sectional view showing an inkjet head according to the embodiment of the present disclosure.

FIG. 1 is a perspective view showing an appearance of an image forming system 100. FIG. 2 is a front view schematically showing an internal structure of the inkjet recording apparatus 1. FIG. 3 is a front view schematically showing a head unit 11 and a maintenance device 30. FIG. 4 is a plan view schematically showing the head unit 11 and a wipe unit 32. FIG. 5 is a plan view schematically showing a cap unit 31. FIG. 6 is a cross-sectional view showing the head unit 11. FIG. 7A to FIG. 7G are front views explaining an operation of the maintenance device 30. Hereinafter, the front side of the paper plane on which FIG. 1 is drawn is defined as the front side of the inkjet recording apparatus 1, and the left-and-right direction will be described with reference to the direction in which the inkjet recording apparatus 1 is viewed from the front side. U, Lo, L, R, Fr and Rr in each drawing indicate the upper, lower, left, right, front and rear, respectively.

The image forming system 100 (see FIG. 1) includes a sheet feeding device 110, an inkjet recording apparatus 1, a drying device 120, and a post-processing device 130. The sheet feeding device 110 stores several thousand sheets, and feeds the sheets to the inkjet recording apparatus 1. The inkjet recording apparatus 1 forms an image on the sheet by an inkjet method. The drying device 120 heats the sheet conveyed from the inkjet recording apparatus 1 to dry the ink. The post-processing device 130 performs post-processing such as punching, stapling, folding, or the like on the sheet S conveyed from the drying device 120.

The inkjet recording apparatus 1 (see FIG. 2) includes a rectangular parallelepiped body housing 3. In the center portion inside the body housing 3, a conveying unit 7 which attracts the sheet and conveys it in the Y direction is provided. Above the conveying unit 7, an image forming unit 6 which forms an image by ejecting the ink is provided. On the right side surface of the body housing 3, a sheet feeding port 8 through which the sheet is introduced from the sheet feeding device 110 is provided. On the left side surface of the body housing 3, a discharge port 9 through which the sheet on which the image is formed is discharged to the drying device 120 is provided. Inside the body housing 3, a conveyance path 10 is provided from the sheet feeding port 8 to the discharge port 9 through a space between the conveying unit 7 and the image forming unit 6. A registration roller 18 is provided on the upstream side of the conveying unit 7 in the conveyance direction Y.

The conveying unit 7 includes an endless conveying belt 21 and a suction part 24. The conveying belt 21 has a large number of air holes (not shown), and is wound around a driving roller 25 and a driven roller 22. The upper surface of the suction part 24 has a large number of air holes (not shown), and is in contact with the inner surface of the conveying belt 21. The suction part 24 sucks air through the air holes of the conveying belt 21 and the air holes of the suction part 24, thereby attracting the sheet S to the conveying belt 21. When the driving roller 25 is driven in the counterclockwise direction by a driving part (not shown) including a motor and a reduction gear, the conveying belt 21 travels in the counterclockwise direction, and the sheet S attracted to the conveying belt 21 is conveyed in the Y direction.

The image forming unit 6 includes one or more (in this embodiment, four) head units 11. The head unit 11 (see FIG. 3 and FIG. 4) includes a plurality of (in this embodiment, three) inkjet heads 12. Ink containers 20 filled with the black, cyan, magenta and yellow inks are connected to the corresponding head units 11.

The inkjet head 12 (see FIG. 6) includes a rectangular parallelepiped housing 12H whose longitudinal direction is along a the front-and-rear direction, a nozzle plate 14 provided at the bottom of the housing 12H, and a socket 12S to which a pipe for supplying the ink is connected. The nozzle plate 14 is provided with a large number of nozzles 14N arranged in the front-and-rear direction. The nozzle 14N includes a branch flow pass 14B branched from the downstream side of the socket 12S, and an ejection port 14A provided on a nozzle surface 14F which is the lower surface of the nozzle plate 14. A diaphragm 14V serves as a part of the inner wall of the branch flow pass 14B. The diaphragm 14V is provided with a pressurizing element 14Z. As the pressurizing element 14Z, a piezoelectric element, an electrostatic actuator, a heater or the like are used. A driving circuit 12D for driving the pressurizing element 14Z is connected to the pressurizing element 14Z.

A control part 2 (see FIG. 2) includes an arithmetic part and a storage part (not shown). The arithmetic part is, for example, a CPU (Central Processing Unit). The storage part includes a storage medium such as a ROM (Read Only Memory), a RAM (Random Access Memory), an EEPROM (Electrically Erasable Programmable Read Only Memory), and the like. The arithmetic part reads out the control program stored in the storage part and executes various processes. The control part 2 may be implemented by an integrated circuit that does not use software.

A display operation part 19 is provided on the upper portion of the body housing 3 (see FIG. 1 and FIG. 2). The display operation part 19 includes a display panel, a touch panel laminated on the display panel, and a keypad (not shown). The control part 2 displays a screen representing an operation menu, a status, or the like of the inkjet recording apparatus 1 on the display panel, and controls each part of the inkjet recording apparatus 1 in accordance with an operation detected by the touch panel and the keypad.

The basic image forming operation of the inkjet recording apparatus 1 is as follows. When an image forming job is inputted to the inkjet recording apparatus 1 from the display operation part 19 or an external computer, the sheet feeding device 110 feeds the sheet S to the conveyance path 10 through the sheet feeding port 8, and the registration roller 18 whose rotation is stopped corrects the skew of the sheet S. When the registration roller 18 sends the sheet S to the conveying unit 7 at a predetermined timing, the conveying unit 7 attracts the sheet S to the conveying belt 21 and conveys the sheet S in the Y direction. The ink is ejected from the inkjet heads 12 to form an image on the sheet S. The sheet S on which the image is formed is discharged to the drying device 120 through the discharge port 9.

[Maintenance Device] Next, a maintenance device 30 will be described. Because the four head units 11 have the same configuration and the four maintenance devices 30 have the same configuration, one head unit 11 and one maintenance device 30 provided on the right side of the head unit 11 will be described.

The head unit 11 includes a head base 11B (see FIG. 3 and FIG. 4) which supports the inkjet heads 12. On the head base 11B, the three inkjet heads 12 are provided in a staggered pattern.

The maintenance device 30 (see FIG. 3) is provided on the lateral side (in the present embodiment, the right side) of the head unit 11. The maintenance device 30 includes a cap unit 31 and a wipe unit 32.

[Cap Unit] The cap unit 31 (see FIG. 3, FIG. 5) includes caps 72 of the same number (three, in the present embodiment) as the inkjet heads 12 provided in the head unit 11. The three caps 72 are arranged in a staggered pattern in the same manner as the inkjet heads 12, and supported by a frame body 71.

[Wipe Unit] The wipe unit 32 (see FIG. 3, FIG. 4) includes a waste liquid tray 81 and cleaning members 82. The waste liquid tray 81 has recesses 810 of the same number as the inkjet heads 12 provided in the head unit 11. The recesses 81U are arranged in a staggered pattern in the same manner as the inkjet heads 12. The cleaning member 82 is provided in each of the recesses 81U. The cleaning member 82 is, for example, a blade. The waste liquid tray 81 includes a driving part (not shown) which slides the cleaning members 82 along the nozzle surfaces 14F. The waste liquid tray 81 is placed on the caps 72. In other words, the wipe unit 32 is placed on the cap unit 31. The head unit 11 is provided with a cleaning liquid supplying device 13 (see FIG. 6) which supplies a cleaning liquid to the nozzle surface 14F.

[Head Lifting Device] Head lifting devices 11L (see FIG. 4) are provided on the front and rear sides of the head base 11B, respectively. The head lifting device 11L includes, for example, a ball screw, a belt driving device, and the like. The head lifting devices 11L lift and lower the head unit 11 between an image forming position and a retracted position. The image forming position (see FIG. 7A) is a position where a distance between the conveyance path 10 (the upper surface of the conveying belt 21) on which the sheet S is conveyed and the nozzle surface 14F is a predetermined distance suitable for the image forming. The image forming position is the lower limit position of the lifting range of the head unit 11 by the head lifting devices 11L. The retracted position (see FIG. 7B) is a position where the head unit 11 does not interfere with the wipe unit 32 when the cap unit 31 and the wipe unit 32 are slid using a cap sliding device 34 described later. The retracted position is the upper limit position of the lifting range of the head unit 11.

[Cap Sliding Device] The cap sliding devices 34 (see FIG. 5) are provided on the front and rear sides of the frame body 71 of the cap unit 31, respectively. The cap sliding device 34 includes, for example, a ball screw, a belt driving device, and the like. The cap sliding devices 34 slide the cap unit 31 to a home position and a maintenance position. The home position (see FIG. 7A) is a position on the right side of the head unit 11 positioned at the image forming position. The maintenance position (see FIG. 7F) is a position below the head unit 11 positioned at the retracted position.

[Wipe Lifting Device] Wipe lifting devices 35 (see FIG. 4) are provided on the front and rear sides of the waste liquid tray 81 of the wipe unit 32, respectively. The wipe lifting device 35 includes, for example, a ball screw, a belt driving device, and the like. The wipe lifting devices 35 lift and lower the wipe unit 32 to a contact position (see FIG. 7B) where the waste liquid tray 81 comes into contact with the caps 72 and a separated position (see FIG. 7E) where the waste liquid tray 81 is separated from the caps 72 by a predetermined distance.

Figure 8:
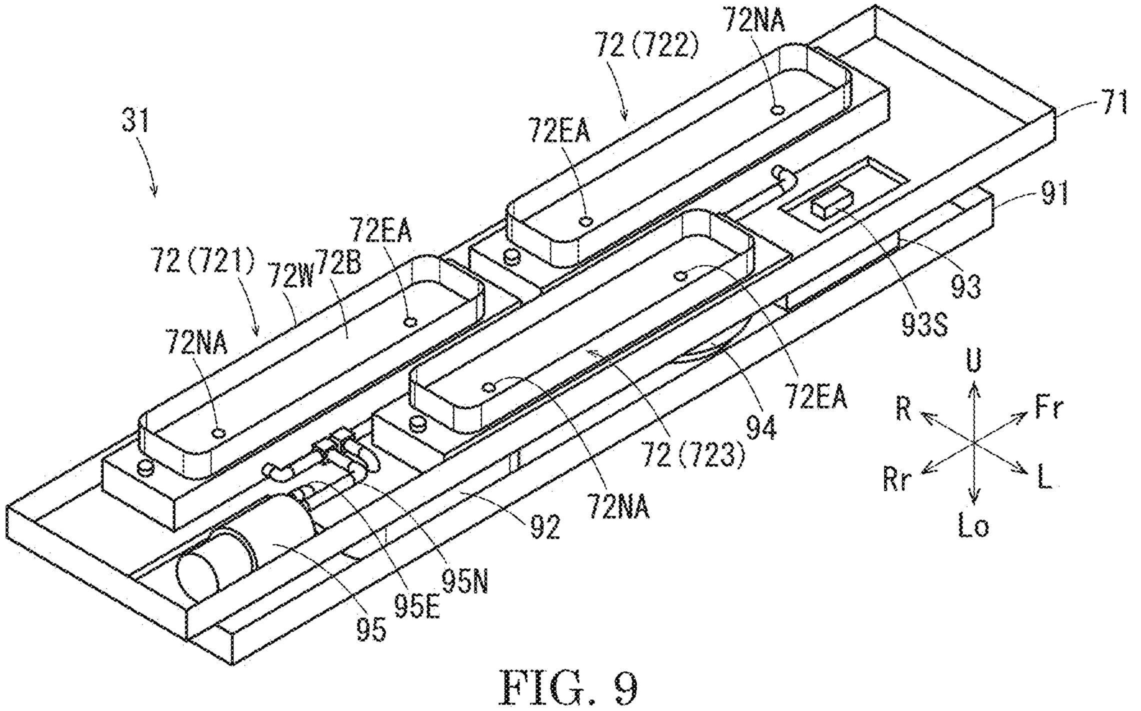
FIG. 8 is a perspective view showing the cap unit according to the embodiment of the present disclosure.
Figure 9:
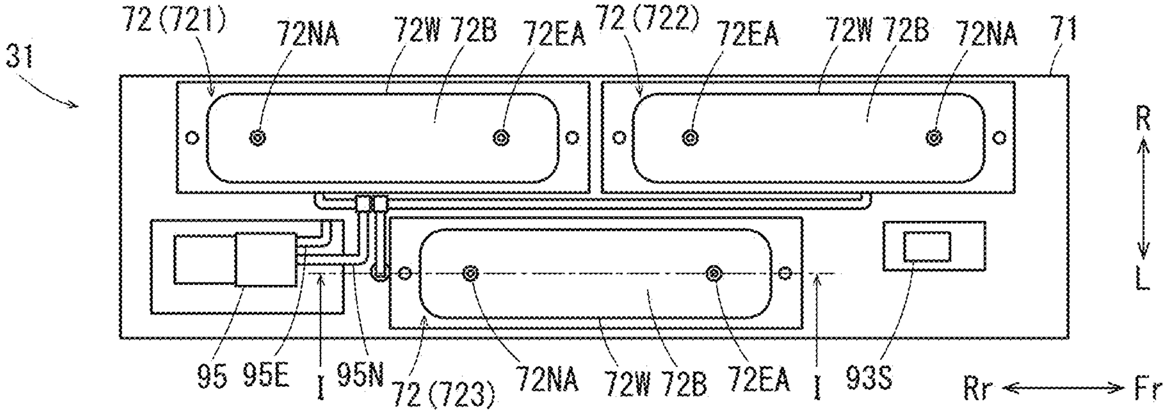
FIG. 9 is a plan view showing the cap unit according to the embodiment of the present disclosure.
Figure 10:
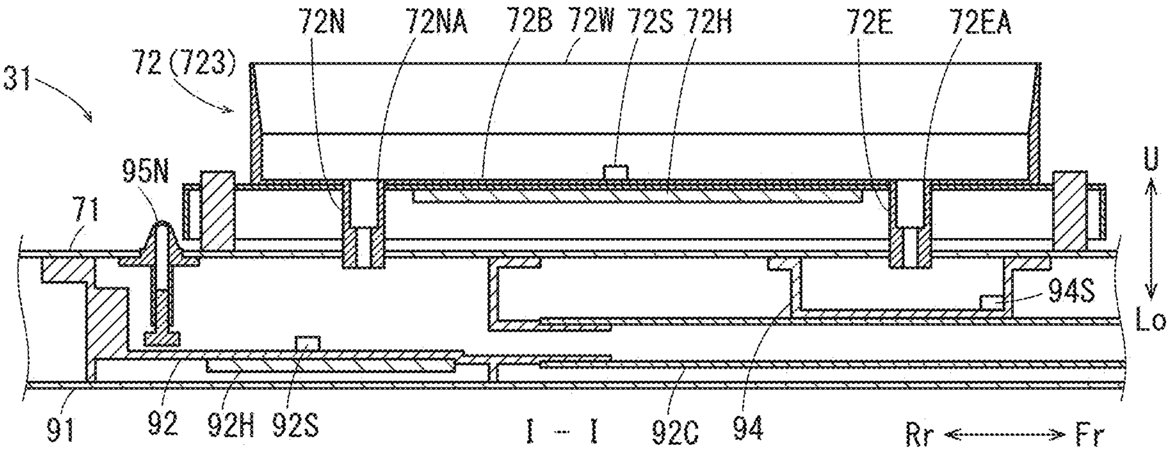
FIG. 10 is a cross-sectional view taken along the line I-I in FIG. 9.
Figure 11:
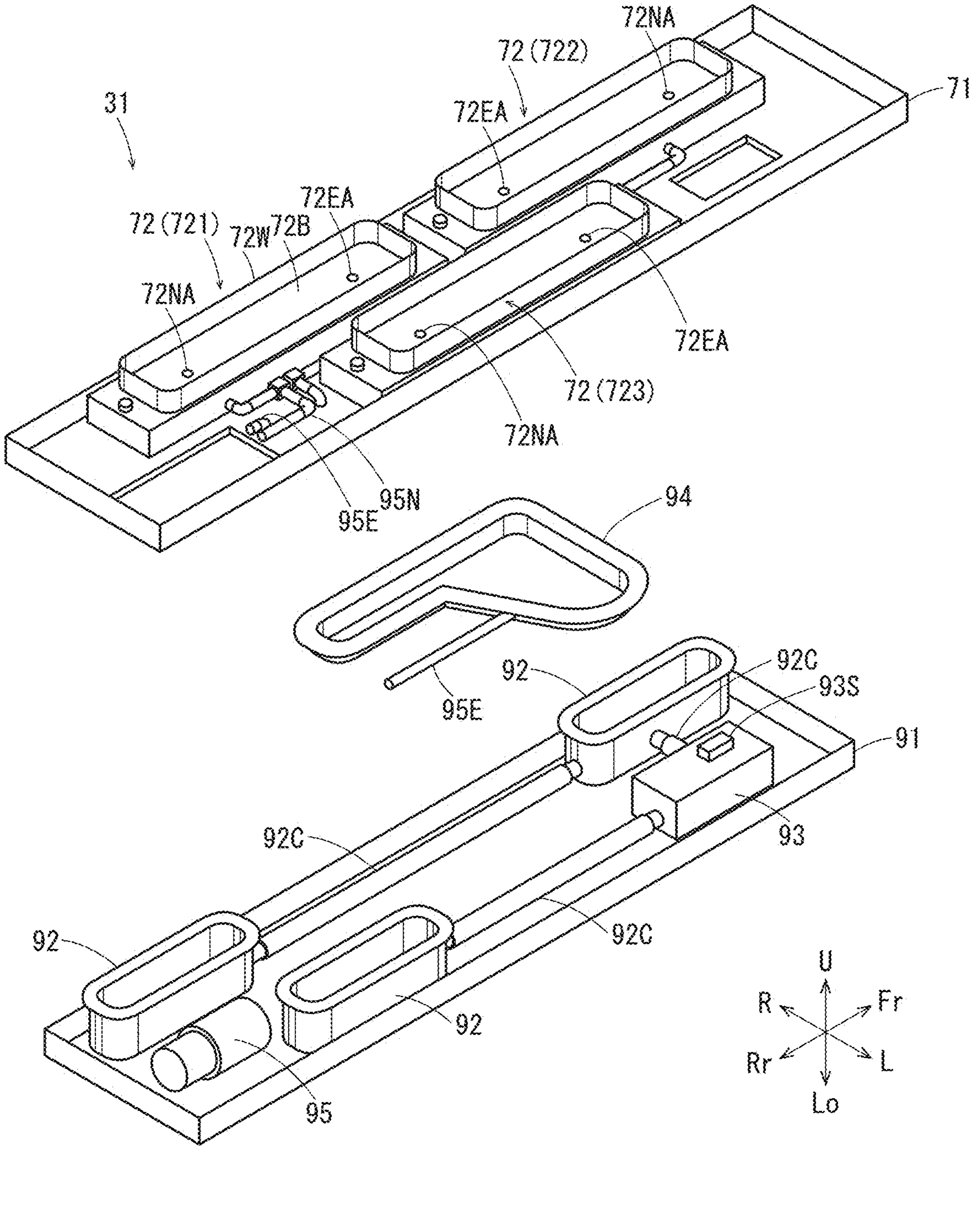
FIG. 11 is a disassembled view showing the cap unit according to the embodiment of the present disclosure.
Figure 12:
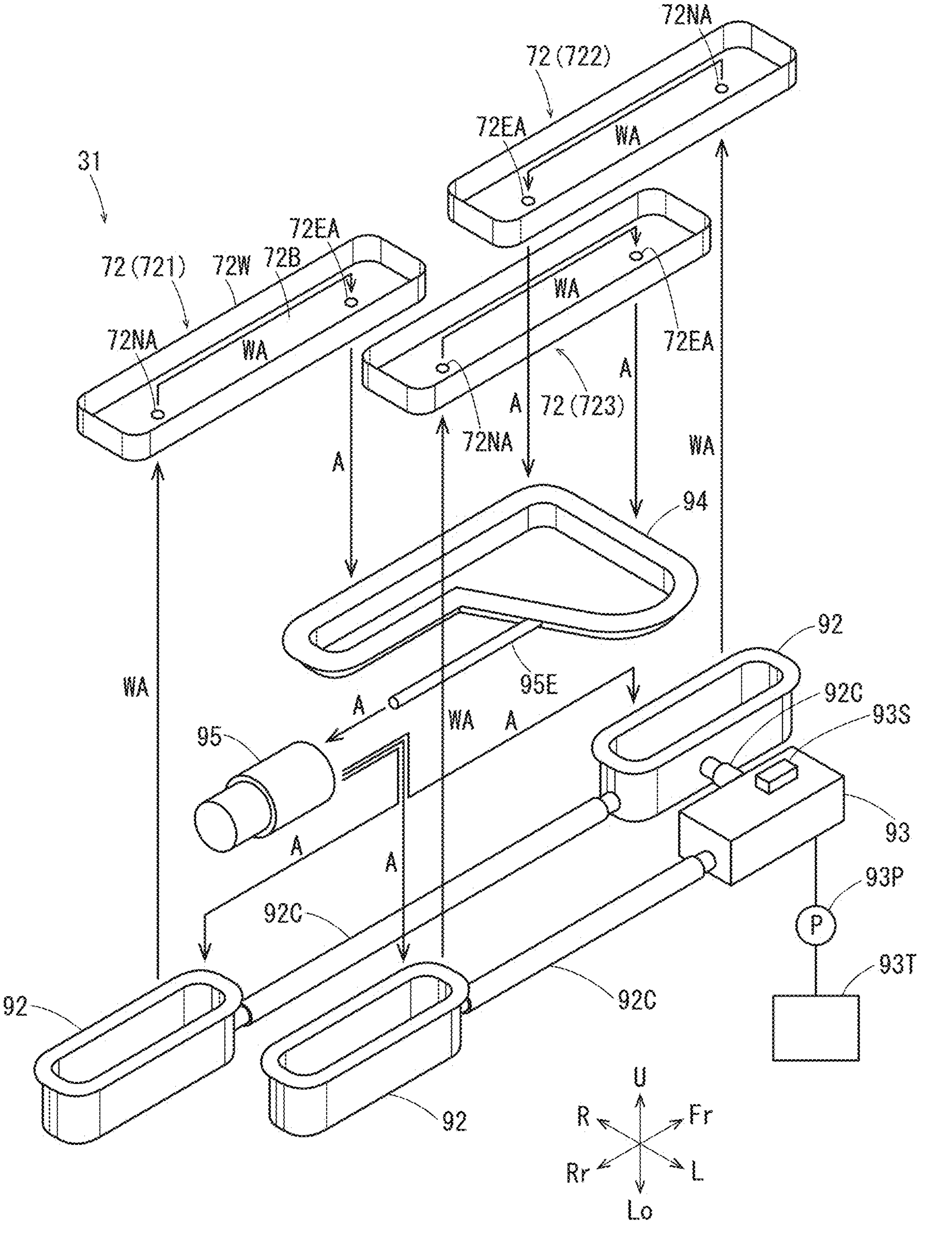
FIG. 12 is a diagram explaining a flow of a humidified air in the cap unit according to the embodiment of the present disclosure.
Figure 13:
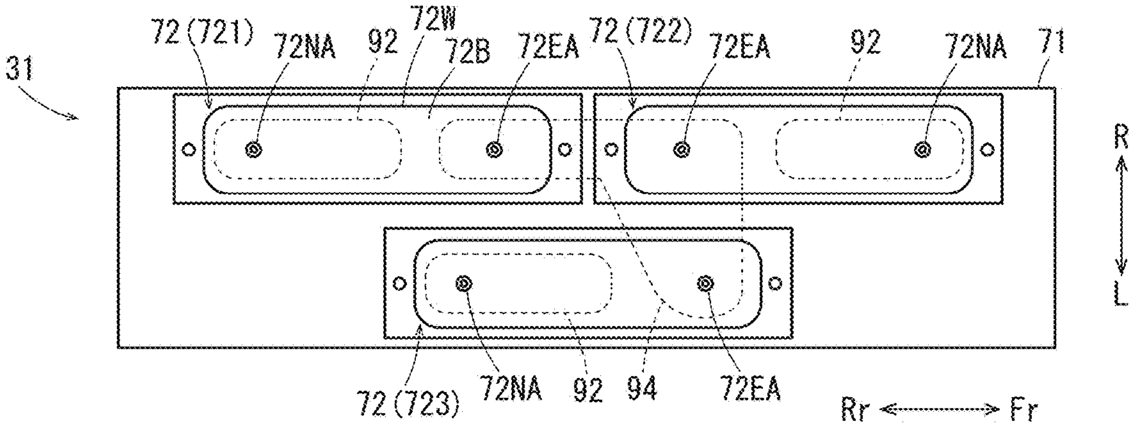
FIG. 13 is a plan view showing positions of a supply part and a recovery part according to the embodiment of the present disclosure.
Figure 14:
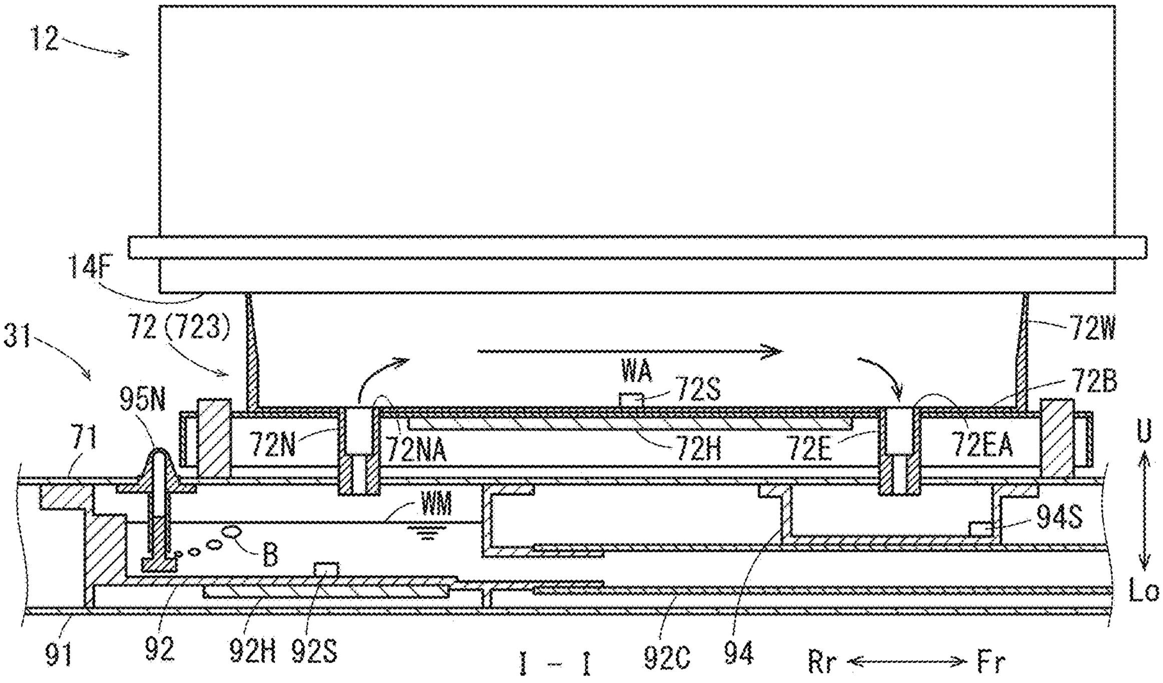
FIG. 14 is a cross-sectional view explaining a flow of a humidified air in the cap according to the embodiment of the present disclosure.

Next, a configuration of the cap unit 31 will be described in detail. FIG. 8 is a perspective view showing the cap unit 31. FIG. 9 is a plan view showing the cap unit 31. FIG. 10 is a cross-sectional view taken along the line I-I in FIG. 9. FIG. 11 is a disassembled view showing the cap unit 31. FIG. 12 is a diagram explaining a flow of a humidified air WA in the cap unit 31. FIG. 13 is a plan view showing positions of a supply part 92 and a recovery part 94. FIG. 14 is a cross-sectional view explaining a flow of a humidified air WA in the cap 72.

The maintenance device 30 according to the embodiment includes a plurality of the caps 72 attached on the nozzle surfaces 14F of the inkjet heads 12, an air supply port 72NA and an air discharge port 72EA which are provided in each of the caps 72, one recovery part 94 which recovers air A through the air discharge ports 72EA of all the caps 72, and a plurality of supply parts 92 which are provided for the caps 72 and supply humidified air WA generated by humidifying the air A recovered by the recovery part 94, to the air supply ports 72NA. The supply parts 92 are arranged around the recovery part 94. In each of the caps 72, the air discharge port 72EA is provided on a side of the recovery part 94, and the air supply port 72NA is provided on a side of the supply part 92.

The caps 72 include a first cap 721, a second cap 722, and a third cap 723. The first cap 721 and the second cap 722 are arranged along a predetermined direction (for example, in the front-and-rear direction), the third cap 723 is arranged at an intermediate position between the first cap 721 and the second cap 722 in the predetermined direction, and is arranged at a position different from the first cap 721 and the second cap 722 in a direction intersecting the predetermined direction. The air discharge port 72EA of the first cap 721 is provided on a side of the second cap 722, and the air discharge port 72EA of the second cap 722 is provided on a side of the first cap 721.

The maintenance device 30 includes a plurality of the caps 72 which are provided for the inkjet heads 12 and are attached on the nozzle surfaces 14F of the inkjet heads 12, the supply parts 92 which are provided for the caps 72, store a humidifying medium WM, generate humidified air WA by passing air A through the humidifying medium WM, and supply the humidified air WA to the cap 72, one sub-tank 93 which stores the humidifying medium WM, is open to the atmosphere, and communicates with the supply parts 92, and a replenishment part (a tank 93T, a pump 93P) which replenishes the humidifying medium WM to the sub-tank 93. The details are as follows.

[Cap] The cap 72 (see FIG. 8 to FIG. 10) is formed in the box-shape opened upwardly. The cap 72 includes a generally rectangular bottom portion 72B whose longitudinal direction is along the front-and-rear direction, and a side wall portion 72W standing upwardly from the edge of the bottom portion 72B. The side wall portion 72W is made of material having flexibility such as rubber. The bottom portion 72B is provided with the air supply port 72NA and the air discharge port 72EA.

The three caps 72 are arranged in a staggered pattern. The first cap 721 is arranged on the right rear portion on the frame body 71, the second cap 722 is arranged in front of the first cap 721, and the third cap 723 is arranged on the left side portion on the frame body 71. In the first cap 721 and the third cap 723, the air discharge port 72EA is provided on the front side, and the air supply port 72NA is provided on the rear side. In the second cap 722, the air discharge port 72EA is provided on the rear side, and the air supply port 72NA is provided on the front side. In the second cap 722, the air discharge port 72EA may be provided on the front side and the air supply port 72NA may be provided on the rear side.

[Supply Part, Recovery Part] Below the frame body 71 (see FIG. 8, FIG. 11 to FIG. 13), the supply parts 92 of the same number as the caps 72 (in this embodiment, three) and one recovery part 94 are provided. Both the supply parts 92 and the recovery part 94 are tanks for storing liquid. The supply parts 92 and the recovery part 94 are supported by a frame body 91. The supply parts 92 are arranged below the air supply ports 72NA of the corresponding caps 72. The recovery part 94 has a shape overlapping all the air discharge ports 72EA in a plan view, and is arranged below all the air discharge ports 72EA.

In other words, the three supply parts 92 are arranged around one recovery part 94, and in each of the three caps 72, the air discharge port 72EA is provided on a side of the recovery part 94, and the air supply port 72NA is provided on a side of the supply part 92. In other words, all the air discharge ports 72EA overlap the recovery part 94 in the upper-and-lower direction, and in each of the caps 72, the air supply port 72NA overlaps the supply part 92 in the upper-and-lower direction.

An air supply pipe 72N (see FIG. 10) is connected to the air supply port 72NA of each of the caps 72 so as to communicate the cap 72 with the supply part 92 below the corresponding cap 72. An air discharge pipe 72E is connected to the air discharge port 72EA of each of the caps 72 so as to communicate the cap 72 with the recovery part 94. That is, the three caps 72 communicate with the recovery part 94.

The air pump 95 is connected to the recovery part 94 by a recovery flow pass 95E (see FIG. 8, FIG. 9 and FIG. 11), and is connected to all the supply parts 92 by a supply flow pass 95N. The air pump 95 recovers the air A having a decreased water vapor pressure from the recovery part 94 through the recovery flow pass 95E, and supplies the recovered air A to all the supply parts 92 through the supply flow pass 95N (see FIG. 12).

All the supply parts 92 are connected to the sub-tank 93 through communication pipes 92C (see FIG. 10, FIG. 11 and FIG. 12). A tank 93T and a pump 93P are connected to the sub-tank 93. A humidifying medium WM (see FIG. 14) is stored in the tank 93T. The humidifying medium WM is, for example, water, but any liquid containing water may be used. The pump 93P supplies the humidifying medium WM from the tank 93T to the sub-tank 93.

The sub-tank 93 is provided with a sensor 93S (see FIG. 8, FIG. 9, FIG. 11 and FIG. 12) for detecting an amount of the humidifying medium WM in the sub-tank 93. The sensor 93S detects, for example, a height of the liquid level in the sub-tank 93. The supply part 92 is provided with a first heating part 92H (see FIG. 10) for heating the supply part 92. The cap 72 is provided with a second heating part 72H for heating the cap 72. The supply part 92 is provided with a sensor 92S for measuring a temperature in the supply part 92. The cap 72 is provided with a sensor 72S for measuring a temperature in the cap 72. The recovery part 94 is provided with a sensor 94S for measuring at least one of a temperature and a humidity in the recovery part 94.

Next, the basic operation of the maintenance device 30 will be described. In the initial state (see FIG. 7A), the head unit 11 is positioned at the image forming position and the cap unit 31 is positioned at the home position. The wipe unit 32 is placed on the cap unit 31. That is, the waste liquid tray 81 is in contact with the caps 72. The control part 2 executes the following processing at a predetermined timing. The predetermined timing is, for example, a timing in which a viscosity of the ink in the nozzle 14N is expected to increase, and more specifically, a case in which a period in which the image forming job is not executed continues for a predetermined period.

Figure 7A:
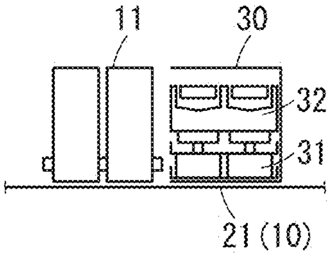
FIG. 7A to FIG. 7G are front views explaining an operation of the maintenance device according to the embodiment of the present disclosure.
Figure 7B:
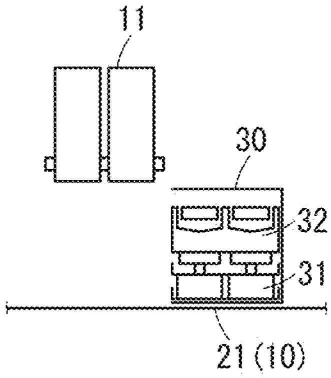

First, the control part 2 operates the head lifting devices 11L to lift the head unit 11 to the retracted position (see FIG. 7B). Next, the control part 2 operates the cap sliding devices 34 to slide the cap unit 31 to the maintenance position (see FIG. 7C). At this time, since the wipe unit 32 is placed on the cap unit 31, the wipe unit 32 slides to the maintenance position together with the cap unit 31. Next, the control part 2 operates the head lifting devices 11L to lower the head unit 11 to a height at which the nozzle surface 14F comes into contact with the cleaning member 82 (see FIG. 7D).

Next, the control part 2 forcibly ejects a predetermined amount of the ink from the inkjet head 12, supplies the cleaning liquid to the nozzle surface 14F, and slides the cleaning member 82 along the nozzle surface 14F. Then, the ink remaining on the nozzle surface 14F is diluted by the cleaning liquid, and the waste liquid containing the ink and the cleaning liquid is scraped off by the cleaning member 82 and falls on the waste liquid tray 81.

Figure 7C:
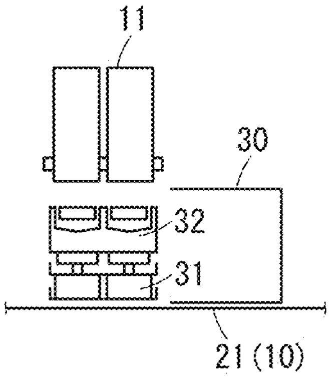
Figure 7D:
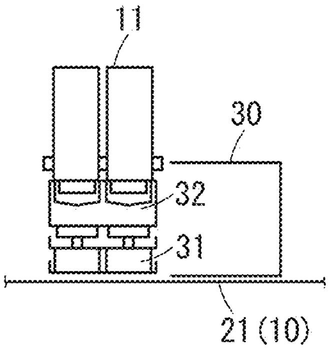

Next, the control part 2 operates the head lifting devices 11L to lift the head unit 11 to the retracted position (see FIG. 7C). Next, the control part 2 operates the cap sliding devices 34 to slide the cap unit 31 and the wipe unit 32 to the home position (see FIG. 7B).

Figure 7E:
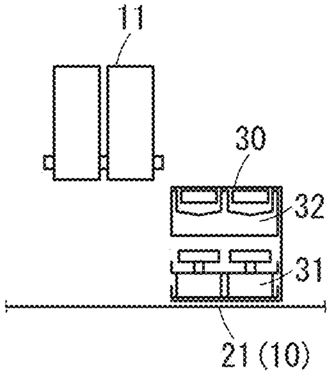
Figure 7F:
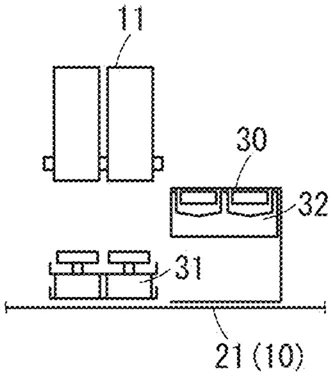

Next, the control part 2 operates the wipe lifting devices 35 to lift the wipe unit 32 to the separated position (see FIG. 7E). Next, the control part 2 operates the cap sliding devices 34 to slide the cap unit 31 to the maintenance position (see FIG. 7F). At this time, since the wipe unit 32 is separated from the cap unit 31, the wipe unit 32 remains at the home position and only the cap unit 31 slides to the maintenance position.

Figure 7G:
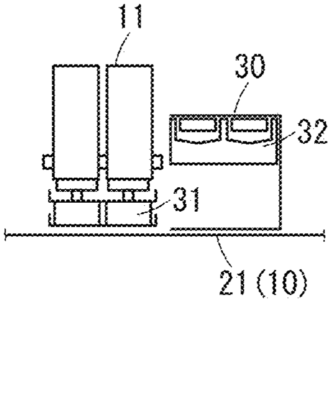

Next, the control part 2 operates the head lifting devices 11L to lower the head unit 11 to a height at which the nozzle surface 14F comes into contact with the cap 72 (see FIG. 7G). Thus, the cap 72 is attached on the nozzle surface 14F.

Next, the control part 2 humidifies the inside of the cap 72. The control part 2 monitors the measured value by the sensor 93S and maintains a height of the liquid level in the sub-tank 93 within a predetermined range. Specifically, when the measured value of the liquid level is lowered than the predetermined range, a predetermined amount of the humidifying medium WM is replenished from the tank 93T to the sub-tank 93 by using the pump 93P. Since the sub-tank 93 communicates with the supply parts 92 by the communication pipes 92C, a height of the liquid level of the humidifying medium WM is uniform in the sub-tank 93 and all the supply parts 92.

The air pump 95 (see FIG. 12) recovers the air A having a decreased water vapor pressure from the recovery part 94 through the recovery flow pass 95E, and supplies the recovered air A to all the supply parts 92 through the supply flow pass 95N. An end portion of the supply flow pass 95N on a side of the supply part 92 is disposed below the liquid level of the humidifying medium WM (see FIG. 14). Therefore, the air A is blown into the humidifying medium WM in the supply part 92, and bubbles B are generated. A water vapor pressure of the bubbles B increases until the bubbles B float upward to the liquid surface. In addition, since the humidifying medium WM in the supply part 92 is heated by the first heating part 92H, water vapor is easily generated. Therefore, a space above the liquid level in the supply part 92 is filled with the humidified air WA having an increased water vapor pressure, and the humidified air WA flows into the cap 72 through the air supply pipe 72N. The air pump 95 may recover and supply the air A continuously or intermittently.

On the other hand, since the air A in the recovery part 94 is sucked by the air pump 95, a negative pressure is generated in the recovery part 94. Therefore, an air flow of the humidified air WA from the air supply port 72NA to the air discharge port 72EA is generated in the cap 72. In addition, since the humidified air WA supplied to the cap 72 is heated by the first heating part 92H, convection is generated in the cap 72, and the high-temperature humidified air WA is supplied to the nozzle surface 14F. Thus, the humidified air WA is exposed to the ink in the nozzles 14N, and the viscosity increase of the ink is suppressed.

In addition to the above control, the control part 2 executes temperature control of each part. Specifically, each of the inkjet heads 12 is provided with a sensor (not shown) for measuring a temperature of the inkjet head 12 (for example a temperature of the ink in the nozzle 14N). As described above, the supply part 92 is provided with the first heating part 92H (see FIG. 10) for heating the supply part 92. The cap 72 is provided with the second heating part 72H for heating the cap 72. The supply part 92 is provided with the sensor 92S for measuring a temperature in the supply part 92. The cap 72 is provided with the sensor 72S for measuring a temperature in the cap 72. The recovery part 94 is provided with the sensor 94S for measuring at least one of a temperature and a humidity in the recovery part 94.

The control part 2 monitors the measured value by the sensor 92S, and controls the first heating part 92H so that a temperature of the supply part 92 is equal to or higher than a temperature of the inkjet head 12. If a temperature of the supply part 92 is lower than a temperature of the inkjet head 12, there is a possibility that a humidity of the humidified air WA supplied from the supply part 92 becomes lower than that in the nozzle 14N of the inkjet head 12, and in this case, a humidifying effect on the ink in the nozzle 14N cannot be obtained. On the other hands, in the present embodiment, the humidified air WA having a higher humidity than that in the nozzle 14N of the inkjet head 12 is supplied.

The control part 2 monitors the measured value by the sensor 72S, and controls the second heating part 72H so that a temperature of the cap 72 is equal to or higher than a temperature of the supply part 92. If a temperature of the cap 72 is lower than a temperature of the supply part 92, a temperature of the humidified air WA supplied from the supply part 92 is lowered in the cap 72. If a temperature of the humidified air WA is lower than the dew point, dew condensation occurs, and a humidity in the cap 72 is decreased, and the humidifying effect cannot be obtained. On the other hand, in the present embodiment, since a temperature of the humidified air WA does not decrease in the cap 72, there is no possibility that a humidity in the cap 72 decreases due to the dew condensation.

When the image forming job is executed, the control part 2 operates the head lifting devices 11L to lift the head unit 11 to the retracted position (see FIG. 7F), operates the cap sliding devices 34 to slide the cap unit 31 to the home position (see FIG. 7E), and operates the wipe lifting devices 35 to lower the wipe unit 32 to the contact position (see FIG. 7B). Then, the control part 2 operates the head lifting devices 11L to lower the head unit 11 to the image forming position and executes the image forming job.

The maintenance device 30 according to the present embodiment described above includes the caps 72 which are attached to the nozzle surfaces 14F of the inkjet heads 12, the supply part 92 which stores the humidifying medium WM, generates the humidified air WA by passing the air A through the humidifying medium WM, and supplies the humidified air WA to the cap 72, the first heating part 92H which heats the supply part 92, and the second heating part which heats the cap 72. According to this configuration, a decrease in humidity of the humidified air WA in the cap can be suppressed.

Further, according to the maintenance device 30 according to the present embodiment, the second heating part 72H heats the cap 72 so that a temperature of the cap 72 is equal to or higher than a temperature of the supply part 92. According to this configuration, a decrease in humidity of the humidified air WA in the cap 72 can be more reliably suppressed.

Further, according to the maintenance device 30 according to the present embodiment, the first heating part 92H heats the supply unit 92 so that a temperature of the supply part 92 is equal to or higher than a temperature of the inkjet head 12. With this configuration, the humidified air WA having a higher humidity than that in the nozzle 14N of the inkjet head 12 can be supplied.

The inkjet recording apparatus 1 according to the present embodiment includes the inkjet head 12 and the maintenance device 30. According to this configuration, an increase in viscosity of the ink in the nozzle 14N can be suppressed.

The invention claimed is:

1. A maintenance device for a head unit including an inkjet head, the maintenance device comprising:
- a cap which is attached to a nozzle surface of the inkjet head;
- a supply part which stores a humidifying medium, generates a humidified air by passing air through the humidifying medium, and supplies the humidified air to the cap;
- a first heating part which heats the supply part; and
- a second heating part which heats the cap, wherein
- the second heating part heats the cap so that a temperature of the cap is equal to or higher than a temperature of the supply part.

2. A maintenance device for a head unit including an inkjet head, the maintenance device comprising:
- a cap which is attached to a nozzle surface of the inkjet head;
- a supply part which stores a humidifying medium, generates a humidified air by passing air through the humidifying medium, and supplies the humidified air to the cap;
- a first heating part which heats the supply part; and
- a second heating part which heats the cap, wherein
- the first heating part heats the supply part so that a temperature of the supply part is equal to or higher than a temperature of the inkjet head.

3. An inkjet recording apparatus comprising:
- an inkjet head; and
- the maintenance device according to claim 1.

* * * * *